(12) United States Patent
Danielsson et al.

(10) Patent No.: US 6,874,382 B2
(45) Date of Patent: Apr. 5, 2005

(54) SOFTWARE CONTROLLED GEAR CHANGE MECHANISM FOR A MOTOR VEHICLE

(75) Inventors: Jan Danielsson, Nykvarn (SE); Kristen Gahm, Stockholm (SE); Per Wallentin, Sodertalje (SE); Peter Svensson, Solna (SE)

(73) Assignee: Scania CV AB (publ) (SE)

( * ) Notice: Subject to any disclaimer, the term of this patent is extended or adjusted under 35 U.S.C. 154(b) by 0 days.

(21) Appl. No.: 10/399,317
(22) PCT Filed: Oct. 18, 2001
(86) PCT No.: PCT/SE01/02279
§ 371 (c)(1), (2), (4) Date: Apr. 16, 2003
(87) PCT Pub. No.: WO02/33290
PCT Pub. Date: Apr. 25, 2002

(65) Prior Publication Data
US 2004/0011152 A1 Jan. 22, 2004

(30) Foreign Application Priority Data
Oct. 19, 2000 (SE) .............................. 0003785

(51) Int. Cl.$^7$ .............................................. F16H 59/00
(52) U.S. Cl. ................................................... 74/335
(58) Field of Search ........................................ 74/335

(56) References Cited

U.S. PATENT DOCUMENTS

| | | | | |
|---|---|---|---|---|
| 4,621,328 A | * | 11/1986 | Arai et al. ..................... | 701/52 |
| 4,911,031 A | * | 3/1990 | Yoshimura et al. ........... | 74/335 |
| 6,019,009 A | * | 2/2000 | Lee .............................. | 74/335 |
| 6,105,448 A | * | 8/2000 | Borschert et al. ............. | 74/335 |
| 6,422,104 B2 | * | 7/2002 | Kamiya ........................ | 74/335 |

FOREIGN PATENT DOCUMENTS

| | | |
|---|---|---|
| DE | 19900820 | 9/1999 |
| EP | 0984210 | 3/2000 |
| EP | 0984211 | 3/2000 |

* cited by examiner

*Primary Examiner*—Dirk Wright
(74) *Attorney, Agent, or Firm*—Ostrolenk, Faber, Gerb & Soffen, LLP

(57) ABSTRACT

The present invention relates to a gear control of a motor vehicle. The gear control incorporates a gear lever (1) which can be placed in at least two mutually spaced gear positions (V1–5), each of which initiates a particular gear change in a gearbox (12). The gear control incorporates at least one power device (4) connected to the gear lever (1), a position reader (7–10) designed to detect the position of the gear lever (1), and a control unit (11) designed to control the power device (4) on the basis of the position of the gear lever (1) so that movements of the gear lever (1) are only allowed along a particular path (3) which is defined by a control unit (11) containing software.

17 Claims, 2 Drawing Sheets

SOFTWARE CONTROLLED GEAR CHANGE MECHANISM FOR A MOTOR VEHICLE

BACKGROUND OF THE INVENTION

1. Field of the Invention

The invention relates to a gear control of a motor vehicle usable with substantially all types of gear boxes, and which imparts the same gear change sensation when used with semi-automatic gear controls as with manual gear controls, but occupies substantially the same space as a semi-automatic gear control.

2. Relevant Art

Manual gearchanging on a motor vehicle is usually initiated by a gear control which is arranged in a driver's cab in the vehicle. The gear control generally incorporates a gear lever which the driver can move along a path in order to place it in the desired gear position. The path is defined by a control gate. A mechanical shaft transmits the movements of the gear lever to the gearbox. Alternatively a flexible wire may transmit the movements of the gear lever to the gearbox. Such mechanical transmissions occupy a relatively large amount of space. Factors such as the presence of said control gate make it necessary to use a gear control which is specifically suited to the particular type of gearbox fitted to the vehicle.

Semi-automatic gearchanging on a vehicle is usually likewise initiated by means of a gear lever. In this case the driver can initiate a gearchange by moving the gear lever to a desired gear position or by a gearchange-indicating movement of the gear lever. An electrical signal is then transmitted from the gear control to the gearbox, whereupon the desired gear is engaged. This means that there is no need for any space-occupying mechanical transmission to transmit the movements of the gear lever to the gearbox. A clutch pedal will generally also be superfluous. It is difficult, however, for the driver to have the same gearchange sensation with such a semi-automatic gear control as with a manual gear control.

SUMMARY OF THE INVENTION

An object of the present invention is therefore to provide a gear control which can be used for substantially all types of gearboxes. A further object is to provide a gear control which imparts the same gearchange sensation as a manual gear control while at the same time not occupying substantially more space than a semi-automatic gear control.

The aforesaid objects are achieved by a gear control including a gear lever, at least one power device connected to the gear lever, a position reader designed to detect the position of the gear lever, and a control unit designed to control the power device on the basis of the position of the gear lever so that movements of the gear lever are only allowed along a particular path which is defined by software incorporated in the control unit. The fact that the control unit controls said power device so that movements of the gear lever are only allowed along a particular path results in the same function as with a control gate. Arranging suitable software in the control unit makes it possible to obtain substantially all types of paths and to have substantially any desired layout of gear positions. This means that the same gear control can be connected to a gearbox of substantially any desired type simply by appropriate change of software in the control unit.

According to a preferred embodiment of the invention, said power device is variable in length and a first end of it is connected to the gear lever and a second end of it is connected to a static structure in the vehicle. The ability of such a power device to change its length can be controlled to block movements of the gear lever outside said particular path but to allow movements within the extent of the path. Alternatively, said power device may be rotatably connected to the gear lever. In that case the power device is connected to a substantially immovable lower portion of the gear lever. The rotary movements of such a power device can be controlled to block movements of the gear lever outside said particular path but to allow movements within the extent of the path. It is advantageous that a first power device be designed to substantially limit movements of the gear lever in its first direction and that a second power device be designed to substantially limit movements of the gear lever in a second direction which is substantially perpendicular to the first direction. As conventional gear levers are in principle movable in two mutually perpendicular directions, such a design results in relatively uncomplicated control of the gear lever. Such a design also results in stable control of the movements of the gear lever along said path. It is advantageous that each of said power devices be designed to be activated by an electric motor. Using electric motors makes it possible to give the power devices a short reaction time and the necessary force for preventing movement of the gear lever outside said path. Alternatively, suitable pneumatic or hydraulic power devices may be used.

According to a second preferred embodiment of the invention, said position reader is optical. An optical position reader enables the position of the gear lever to be read with great accuracy without affecting the movements of the lever. Such a sensor may incorporate on the gear lever a diode which transmits an infra-red light beam towards a photosensitive detector which has a fixed position in the vehicle. Alternative position readers may be resistive, capacitive, inductive or magnetic. When the gear lever is moved to one of said gear positions, the control unit is designed to send a signal to the gearbox in order to initiate engagement of the gear which corresponds to the gear position of the gearbox. Such a signal is with advantage electrical and reaches the gearbox via an electric cable. Arranging an electric cable between the gear control and the gearbox requires very little space compared with a mechanical transmission.

According to another preferred embodiment of the present invention, said power devices are designed to indicate to the driver when the gear control is in/out of said gear positions. To enable the driver to feel by hand when the gear lever reaches a gear position, said power devices may create an increased non-rigid resistance shortly before the gear lever reaches the relevant gear position. Suitable software in the control unit makes it possible to increase the gearchange sensation further by giving said power devices different functions depending on the position of the gear lever along said path. The power devices may for example transmit springing, damping, pulsating or vibrating forces to the gear lever.

According to another preferred embodiment of the present invention, the control unit is designed to prevent the gear lever being moved to one or more of said gear positions during certain operating states of the vehicle. Depending on various parameters such as, for example, the speed of the vehicle, the engagement of certain gears may be inappropriate and/or damaging to the vehicle's engine and driveline. The control unit can thus prevent an incorrect gear being engaged by mistake.

According to another preferred embodiment of the present invention, one of said gear positions involves activation of an automatic gearchange function. A vehicle with the gear control described above usually incorporates a gearchange mechanism which alters the gear ratio of the gearbox according to electrical signals received from the gear control. Having the control unit determine instead when gear changing should take place on the basis of information about parameters which are relevant for changing gear is not very complicated. It is therefore an advantage if the driver has the possibility of moving the gear lever to a gear position which initiates automatic gearchanging of the vehicle.

BRIEF DESCRIPTION OF THE DRAWINGS

Preferred embodiments of the invention are described below by way of examples with reference to the attached drawings, in which.

DETAILED DESCRIPTION OF PREFERRED EMBODIMENTS OF THE INVENTION

Figure 1:
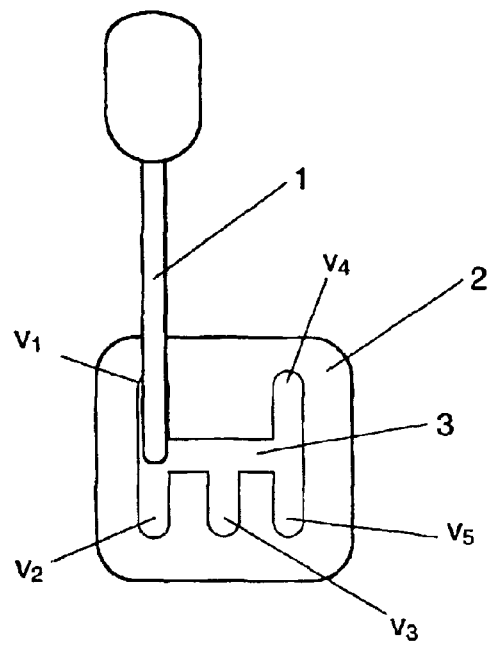
FIG. 1 depicts schematically a manual gear control.

FIG. 1 depicts a conventional manual gear control. The gear control incorporates a gear lever 1 which can be placed in a number of mutually spaced gear positions $v_{1-5}$. The gear control also incorporates a control gate 2 which allows movements along a particular path 3 to said gear positions $v_{1-5}$. The extent of such paths 3 is substantially standardised in vehicles so that a vehicle driver knows exactly how to move the gear lever between the various gear positions $v_{1-5}$. The fact that conventional gear controls usually incorporate such a control gate 2 means that they are at least limited to being connectable to gearboxes that have a number of gears ($v_{1-5}$) which corresponds to the control gate 2.

Figure 2:
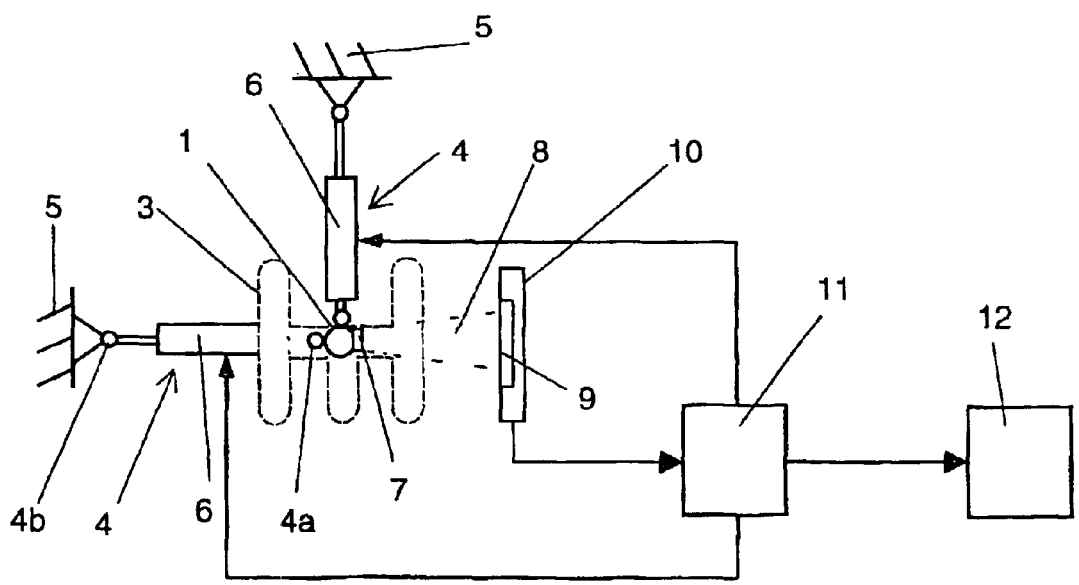
FIG. 2 depicts a gear control according to a first embodiment.

FIG. 2 depicts a first embodiment of the present invention. In this case a gear lever 1 is viewed from above. A variable-length first power device 4 and a variable-length second power device 4 which are of substantially identical design each have a first end 4a connected to the gear lever 1 and a second end 4b connected to a static structure 5 in the vehicle. The ends 4a, 4b of the power devices 4 are articulatedly connected at the fastening points. Each of the two variable-length power devices 4 has its electric motor 6 which is designed to alter the length of the power devices 4. Suitable electric motors 6 enable the power devices 4 to change length quickly and to exert a relatively large force. The two variable-length power devices 4 are designed to act in a plane which is substantially perpendicular to the main direction of extent of the gear lever 1. The power devices 4 are variable in extent in directions which form an angle of about 90° to one another.

An optical position-reading arrangement incorporates a diode 7 which is arranged firmly on the gear lever 1. The diode 7 is designed to emit an infra-red light beam 8 towards a photosensitive surface 9 which is incorporated in a photosensitive detector 10. The photosensitive detector 10 emits a first current signal which is related to the incident light intensity and a second current signal which is related to a centre of the incident light. The position of the gear lever can thus be determined with good accuracy. A control unit 11, which incorporates readily interchangeable software, is designed to activate and control the electric motors 6 and hence the power devices 4 on the basis of knowledge of the position of the gear lever 1 so that the gear lever 1 can only move along a particular path 3 to various gear positions $v_{1-5}$. The software in the control unit 11 can be changed to provide different paths for the same gear control. In FIG. 2, broken lines are used to depict such a path 3. Accordingly there is no need for any control gate 2, since the software in the control unit 11 defines the extent of the path. When the gear lever 1 is moved to one of said gear positions $v_{1-5}$, the control unit 11 is designed to send an electrical signal via an electric cable to a gearbox 12. The gearbox 12 incorporates a gearchange mechanism which engages the gear which corresponds to the gear position $v_{1-5}$ of the gear lever 1. This means that only an electric cable has to be arranged between the gear control and the gearbox 12. Such a cable occupies very little space. As the actual engagement of a new gear takes place automatically, the vehicle needs no clutch pedal.

The control unit 11 receives from the position-reading arrangement substantially continuous information concerning the position of the gear lever 1. This enables the control unit 11 to activate the electric motors 6 so that the power devices 4 exert maximum force to block such directions of movement of the gear lever 1 as do not follow the extent of the path 3. To enable a driver wishing to engage a different gear to feel by hand when the gear lever 1 reaches a gear position $v_{1-5}$, the power devices 4 create an increased non-rigid resistance when the gear lever 1 passes a short section substantially just before the gear position $v_{1-5}$. To further increase the gearchange sensation, suitable software may be used in the control unit 11 to make the power devices 4 provide other functions depending on the position of the gear lever 1 along said path 3. The power devices 4 may for example transmit a spring force, a damping force, a pulsating force or a vibrating force to the gear lever 1 to provide the driver with a corresponding gearchange sensation as in a manual gear control. In certain operating states of the vehicle, the control unit 11 is designed to prevent the gear lever 1 being moved to one or more of the gear positions $v_{1-5}$. Depending on various parameters such as the vehicle's speed, the engagement of a certain gear may in certain situations be inappropriate and/or damaging to the vehicle's engine and driveline. The control unit 11 thus prevents an incorrect gear being engaged by mistake. One of said gear positions $v_{1-5}$ may incorporate activation of an automatic gearchange function. A vehicle with the gear control described above thus incorporates already a gearchange mechanism which engages a desired gear on the basis of two signals received from the gear control. Having the control unit 11 determine instead when gear changing should take place on the basis of information about parameters relevant to the gearchange process entails no major modification. It is therefore an advantage if the driver is provided with the possibility of moving the gear lever to such a gear position $v_{1-5}$ which initiates automatic gearchanging of the vehicle.

Figure 3:
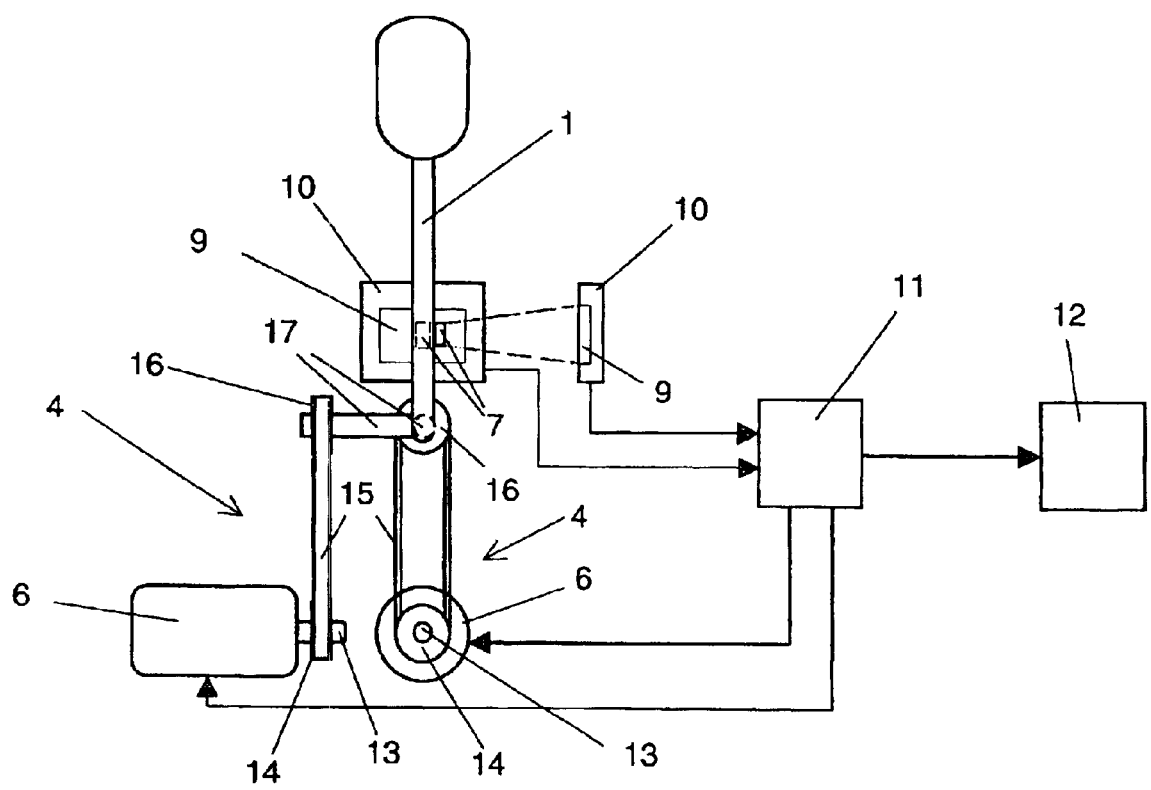
FIG. 3 depicts a gear control according to a second embodiment.

FIG. 3 depicts an alternative embodiment of the present invention. In this embodiment, first and second power devices 4 are applied. Each of the power devices 4 incorporates an electric motor 6. Each of the electric motors 6 has protruding from it a first shaft 13 which is provided with a first sprocket 14. A chain 15 is designed to transmit the motion of the first sprocket 14 to a second sprocket 16 which is arranged on a second shaft 17. The second shaft 17 is suitably fastened to a lower portion of the gear lever 1. This lower portion of the gear lever 1 has a substantially immovable position. The second shafts 17 are arranged at a substantially right angle to one another. The gear lever 1 may possibly be angled relative to its lower portion so that a portion situated higher up of the gear lever 1 is arranged for movement along the path. A movable portion of the gear lever 1 incorporates a position reader. The position reader incorporates in this case two diodes 7 which are firmly arranged on the gear lever 1. Each of the diodes 7 is designed to emit an infra-red light beam 8 towards its respective photosensitive detector 10 which incorporates a photosensitive surface 9. The position of the gear lever 1 can thus be determined in the two main directions of movement of said lever. The control unit 11 is designed to receive information from the photosensitive detectors 10 in order to activate and control the electric motors 6 on the basis of knowledge of the position of the gear lever 1. When the gear lever 1 is moved to a gear position, the control unit 11 is designed to send an electric signal via an electric cable to the gearbox 12. The gearbox 12 incorporates a gearchange mechanism which engages the gear which corresponds to the gear position $v_{1-5}$ of the gear lever 1. Each of the electric motors 6 is in this case allowed to block or influence movements of the gear lever 1 in its respective substantially perpendicular direction so that a movable portion of the gear lever 1 is only arranged for movement along a path 3 which is determined by the software in the control unit 11.

The gear controls described in FIGS. 2 and 3 afford the advantage of being connectable to substantially all types of gearboxes 12 irrespective of the number of gears. Adapting the gear control to a different type of gearbox 12 is achieved by simply replacing the software of the control unit 11 by different software. It is also possible to use software which defines paths 3 which are suited to the wishes of individual persons.

The invention is in no way limited to the embodiments described but may be varied freely within the scopes of the patent claims. For example, the electric motors 6 in FIG. 3 may by connected directly via their output shafts to the lower portion of the gear lever 1 without any intermediate transmission elements. Alternatively, the transmission elements may be of substantially any functional kind desired and may be arranged between the output shaft 13 of the electric motor 6 and the lower portion of the gear lever 1.

It is intended therefore, that the present invention not be limited not by the specific disclosure herein, but to be given the full scope indicated by the appended claims.

What is claimed is:

1. A gear control for a motor vehicle gear box comprising;
   an operator-manipulated gear lever which can be placed in at least two mutually spaced gear positions, each of which initiates a particular gear change in the gearbox;
   a power device connected to the operator-manipulated gear lever and operable to control movement of the operator-manipulated gear lever alone a particular path;
   a position reader operable to detect the position of the operator-manipulated gear lever; and
   a control unit including software responsive to the position of the gear lever detected by the position reader, and the control unit is operative to control the power device on the basis of the detected position of the operator-manipulated gear to control the movements of the operator-manipulated gear lever to be only along a particular path which is defined by the software included in the control unit.

2. A gear control according to claim 1, wherein the power device includes an electric motor controlled by the control unit.

3. A gear control according to claim 1, wherein the power device comprises a first and a second power device operatively connected to the gear lever to control movement thereof and wherein:
   the first power device is operative to permit movement of the operator-manipulated gear lever in a first direction;
   the second power device is operative to permit movement of the operator manipulated gear lever in a second direction which is substantially perpendicular to the first direction; and
   the control unit is operative to control the first and second power devices such that movements of the operator-manipulated gear lever in the first and second directions are defined by the software included in the control unit.

4. A gear control according to claim 3, wherein the first and second power devices each include an electric motor.

5. A gear control according to claim 3, wherein the first and second power devices are variable in length and include respective first ends connected to the operator-manipulated gear lever and respective second ends connected to a static structure in the vehicle.

6. A gear control according to claim 1, wherein the power device is variable in length and includes a first end connected to the gear lever and a second end connected to a static structure in the vehicle.

7. A gear control according to claim 1, wherein the power device is rotatably connected to the gear lever.

8. A gear control according to claim 1, wherein the position reader is an optical device.

9. A gear control for a motor vehicle gearbox comprising;
   a gear lever which can be placed in at least two mutually spaced gear positions, wherein each of the positions initiates a particular gear change in the gearbox;
   a first power device operatively connected to the gear lever and the first sower device being operative to permit movement of the gear lever in a first direction;
   a second power device operatively connected to the gear lever and the second power device being operative to permit movement of the gear lever in a second direction which is substantially perpendicular to the first direction:
   wherein the first and second power devices are operative to provide an operator of the gear lever with a perceptible indication when the gear lever is moved into and out of at least one of the gear positions;
   a position reader operative to detect the position of the near lever;
   a control unit including software responsive to the position of the gear lever detected by the position reader, and the control unit is operative to control the first and the second power devices on the basis of the detected position of the gear lever to control the movements of the gear lever to be along a particular path which is defined by the software included in the control unit.

10. A gear control according to claim 9, wherein each of the first and second power devices includes an electric motor.

11. A gear control according to claim 9, wherein each of the first and second power devices is variable in length and each includes a respective first end connected to the gear lever and a respective second end connected to a static structure in the vehicle.

12. A gear control according to claim 9, wherein at least one the power devices is rotatably connected to the gear lever.

13. A gear control according to claim 9, wherein the position reader is an optical device.

14. A gear control for a motor vehicle near box comprising:
   a gear lever which can be placed in at least two mutually spaced near positions, and each position initiates a particular sear change in the gearbox;

a power device connected to the gear lever and operable to control movement of the gear lever along a particular path;

a position reader operable to detect the position of the gear lever; and a control unit including software responsive to the position of the gear lever detected by the position reader, and the control unit is operative to control the power device on the basis of the detected position of the gear lever to control the movements of the gear lever to be only along a particular path which is defined by the software included in the control unit.

wherein the control unit is responsive to selection of a gear position by the gear lever to send a signal to the gearbox to initiate engagement of a gear corresponding to the selected position.

15. A gear control for a motor vehicle gear box comprising:

a gear lever which can be placed in at least two mutually spaced gear positions, and each position initiates a particular gear change in the gearbox;

a power device connected to the near lever and operable to control movement of the gear lever along a particular path;

wherein the power device is operative to provide a driver of a vehicle with a perceptible indication when the gear lever is moved into and out of a gear position;

a position reader operable to detect the position of the gear lever; and a control unit including software responsive to the position of the gear lever detected by the position reader, and the control unit is operative to control the power device on the basis of the detected position of the gear lever to control the movements of the gear lever to be only along a particular path which is defined by the software included in the control unit.

16. A gear control for a motor vehicle gear box comprising;

a near lever which can be placed in at least two mutually spaced near positions, and each position initiates a particular gear change in the gearbox:

a power device connected to the gear lever and operable to control movement of the gear lever along a particular path;

wherein the control unit is operative to prevent the gear lever from being moved to one of the gear positions during certain operating states of the vehicle;

a position reader operable to detect the position of the gear lever; and a control unit including software responsive to the position of the sear lever detected by the position reader, and the control unit is operative to control the power device on the basis of the detected position of the gear lever to control the movements of the gear lever to be only along a particular path which is defined by the software included in the control unit.

17. A gear control for a motor vehicle gear box comprising:

a gear lever which can be placed in at least two mutually spaced gear positions, at least one of the positions initiates a particular gear change in the gearbox and wherein one of the gear positions activates an automatic gear change function;

a power device connected to the gear lever;

a position reader constructed to detect the position of the near lever; and a control unit including software responsive to the position reader, and the control unit is operative to control the power device on the basis of the position of the near lever such that movements of the gear lever are only allowed along a particular oath which is defined by the software included in the control unit.

* * * * *

UNITED STATES PATENT AND TRADEMARK OFFICE
CERTIFICATE OF CORRECTION

PATENT NO.     : 6,874,382 B2
DATED          : April 5, 2005
INVENTOR(S)    : Jan Danielsson et al.

It is certified that error appears in the above-identified patent and that said Letters Patent is hereby corrected as shown below:

<u>Title page,</u>
Item [75], Inventors, change the 2$^{nd}$ inventor to: -- Kristin Gahm, Stockholm (SE) --

Signed and Sealed this

Fifth Day of July, 2005

JON W. DUDAS
*Director of the United States Patent and Trademark Office*